(12) United States Patent
Fahrbach et al.

(10) Patent No.: US 11,016,277 B2
(45) Date of Patent: *May 25, 2021

(54) METHOD AND DEVICE FOR EXAMINATION OF A SAMPLE

(71) Applicant: Leica Microsystems CMS GmbH, Wetzlar (DE)

(72) Inventors: Florian Fahrbach, Mannheim (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,376

(22) Filed: Feb. 7, 2020

(65) Prior Publication Data

US 2020/0278522 A1  Sep. 3, 2020

Related U.S. Application Data

(63) Continuation of application No. 15/565,428, filed as application No. PCT/EP2016/058107 on Apr. 13, 2016, now Pat. No. 10,585,271.

(51) Int. Cl.
*G02B 21/00* (2006.01)
*G02B 21/06* (2006.01)
(Continued)

(52) U.S. Cl.
CPC ....... *G02B 21/0032* (2013.01); *G02B 21/002* (2013.01); *G02B 21/0048* (2013.01);
(Continued)

(58) Field of Classification Search
CPC .............. G02B 21/0032; G02B 21/002; G02B 21/0048; G02B 21/0076; G02B 21/06; G02B 21/16; G02B 21/367
(Continued)

(56) References Cited

U.S. PATENT DOCUMENTS

2006/0033987 A1  2/2006  Stelzer et al.
2011/0084217 A1  4/2011  Redford
(Continued)

FOREIGN PATENT DOCUMENTS

DE       10257423 A1     6/2004
DE    102007017598 A1    10/2008
(Continued)

OTHER PUBLICATIONS

Eugen Baumgart et al: "Scanned light sheet microscopy with confocal slit detection", Optics Express, vol. 20, No. 19, Sep. 10, 2012 (Sep. 10, 2012), pp. 21805-21814, XP055093819.
(Continued)

*Primary Examiner* — Nguyen T Truong
(74) *Attorney, Agent, or Firm* — Leydig, Voit & Mayer, Ltd.

(57) ABSTRACT

A device is configured to carry out a method for examining a sample comprising: illuminating the sample in an illumination plane along an illumination strip by an illuminating light beam which propagates along the illumination strip, wherein the illuminating light beam is formed as a light sheet; projecting the illumination strip into a detection plane by detection light originating from the illumination strip being focused in the detection plane; and detecting the detection light by a detector. The detector is formed as a slit detector.

22 Claims, 12 Drawing Sheets

(51) Int. Cl.
*G02B 21/16* (2006.01)
*G02B 21/36* (2006.01)

(52) U.S. Cl.
CPC ......... *G02B 21/0076* (2013.01); *G02B 21/06* (2013.01); *G02B 21/16* (2013.01); *G02B 21/367* (2013.01)

(58) Field of Classification Search
USPC .......................................................... 348/79
See application file for complete search history.

(56) References Cited

U.S. PATENT DOCUMENTS

| | | | |
|---|---|---|---|
| 2011/0115895 A1* | 5/2011 | Huisken | G02B 21/008 348/79 |
| 2012/0200693 A1 | 8/2012 | Lippert et al. | |
| 2013/0335818 A1 | 12/2013 | Knebel et al. | |

FOREIGN PATENT DOCUMENTS

| | | |
|---|---|---|
| DE | 102009044983 A1 | 3/2011 |
| DE | 102011000835 A1 | 8/2012 |

OTHER PUBLICATIONS

Kevin M. Dean, et al., "Uniform and scalable light-sheets generated by extended focusing", Optics Express, vol. 22, No. 21, Oct. 16, 2014, pp. 1-12.

Liang Gao, "Extend the field of view of selective plan illumination microscopy by tiling the excitation light sheet", Optics Express, vol. 23, No. 5, Feb. 26, 2015, pp. 1-10.

"Large-field high-resolution two-photon digital scanned light-sheet microscopy", Cell Research (2014): 1-4, Sep. 26, 2014, pp. 1-4.

* cited by examiner

METHOD AND DEVICE FOR EXAMINATION OF A SAMPLE

CROSS-REFERENCE TO PRIOR APPLICATIONS

This application is a continuation of U.S. application Ser. No. 15/565,428, filed Oct. 10, 2017, which is a U.S. National Stage Application under 35 U.S.C. § 371 of International Application No. PCT/EP2016/058107 filed on Apr. 13, 2016, and claims benefit to German Patent Application No. DE 10 2015 105 624.0 filed on Apr. 13, 2015, all of which applications are hereby incorporated by reference herein. The International Application was published in German on Oct. 20, 2016 as WO 2016/166151 A1 under PCT Article 21(2).

FIELD

The invention relates to a method for examining a sample, in which method the sample is illuminated in an illumination plane along an illumination strip by means of an illuminating light beam which propagates along the illumination strip, and in which the illumination strip is projected into a detection plane by detection light originating from the illumination strip being focused in the detection plane, and in which the detection light is detected by a detector.

The invention additionally relates to a device for carrying out this type of method, and in particular to a device for examining a sample comprising an illumination device which illuminates the sample in an illumination plane along an illumination strip by means of an illuminating light beam which propagates along the illumination strip, and comprising a detection optics which comprises a detection objective and which focuses the detection light originating from the illumination strip in a detection plane in which a detector is arranged and thus projects the illumination strip onto the detector.

BACKGROUND

The SPIM (single plane illumination microscopy) technique, in which a sample is illuminated in layers, allows a quicker detection, which is also gentler on the sample, of image data compared to a scanning of a sample at specific points, for example. A known field of use of SPIM technology is the field of fluorescence microscopy, wherein fluorophores are excited in the sample by means of laser light. In the case of SPIM technology, an excitation takes place here only in one plane by an illumination light sheet. Damage to the sample caused by illumination light in other planes is hereby avoided.

An optical device that functions in accordance with the SPIM method is described in DE 102 57 423 A1. In the case of this microscope, a sample is illuminated with a thin light sheet, whilst being observed perpendicularly to the plane of the illuminating light sheet. Here, the illumination and the detection take place over two separate optical beam paths each with a separate optics, in particular with two separate objectives perpendicular to one another.

DE 10 2009 044 983 A1 discloses a microscope which comprises an illumination means with which a light sheet for illuminating a sample region is generated, which light sheet is extended approximately flat in the direction of an illumination axis of an illumination beam path and in the direction of a transverse axis disposed transverse to the illumination axis. The microscope additionally comprises a detection means with which light irradiated from the sample region along a detection axis of a detection beam path is detected, wherein the illumination axis and detection axis and also the transverse axis and detection axis are arranged at an angle with respect to one another different from zero, and wherein the detection means additionally comprises a detection objective in the detection beam path. In the case of a microscope of this kind, the detection means additionally comprises an optical detection element, which is arranged spatially separate from a front lens of the detection objective, is adjustable independently thereof, and by means of which the size of a detection image field can be continuously varied, and/or by means of which a detection focus plane in the sample region can be continuously adjusted.

Dean, K. & Fiolka, R., "Uniform and scalable light-sheets generated by extended focusing", Opt. Express 22, 26141-26152 (2014) discloses a system in which a thin, short illumination beam with a quickly tunable lens is moved back and forth along the optical axis. Due to the shallower depth of field of the beam, said beam can be thinner, which should increase the image contrast. However, since fluorescence is excited also in the out-of-focus region of the beam, a slit diaphragm is used in order to achieve the desired effect. This slit diaphragm runs in a conjugated plane in the detection beam path in a collinear manner with the illumination beam. In spite of the use of the slit diaphragm, the increase of the image contrast is relatively small, in particular because a lot of fluorescence light is detected that has not been excited by the focus of the illumination beam.

Zong, W. et al. "Large-field high-resolution two-photon digital scanned light-sheet microscopy" Cell Res. (2014) discloses a similar microscope, wherein, however, a non-linear fluorescence excitation is provided there. A microscope of this kind is also described in CN 104407436.

In Gao, L., "Extend the field of view of selective plan illumination microscopy by tiling the excitation light sheet", Opt. Express, 23, 6102-6111 (2015), it is disclosed to displace the light sheet generated by a scanned illumination beam in a plurality of separate steps along the illumination axis and to then join together the images obtained individually for each step. This method has the disadvantage that it takes a long time to record a number of individual images one after the other. Furthermore, the effective thickness of the illuminated region is not uniform over the field of view along the direction of propagation of the illuminating beam. The illuminating light beam is always thinner in the middle of the individual images than at the edge. The image formed from individual images thus consists in alternation of regions which have been illuminated by thinner and thicker light beams, that is to say with higher and lower contrast.

SUMMARY

In an embodiment, the present invention provides a device configured to carry out a method for examining a sample comprising: illuminating the sample in an illumination plane along an illumination strip by an illuminating light beam which propagates along the illumination strip, wherein the illuminating light beam is formed as a light sheet; projecting the illumination strip into a detection plane by detection light originating from the illumination strip being focused in the detection plane; and detecting the detection light by a detector. The detector is formed as a slit detector.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
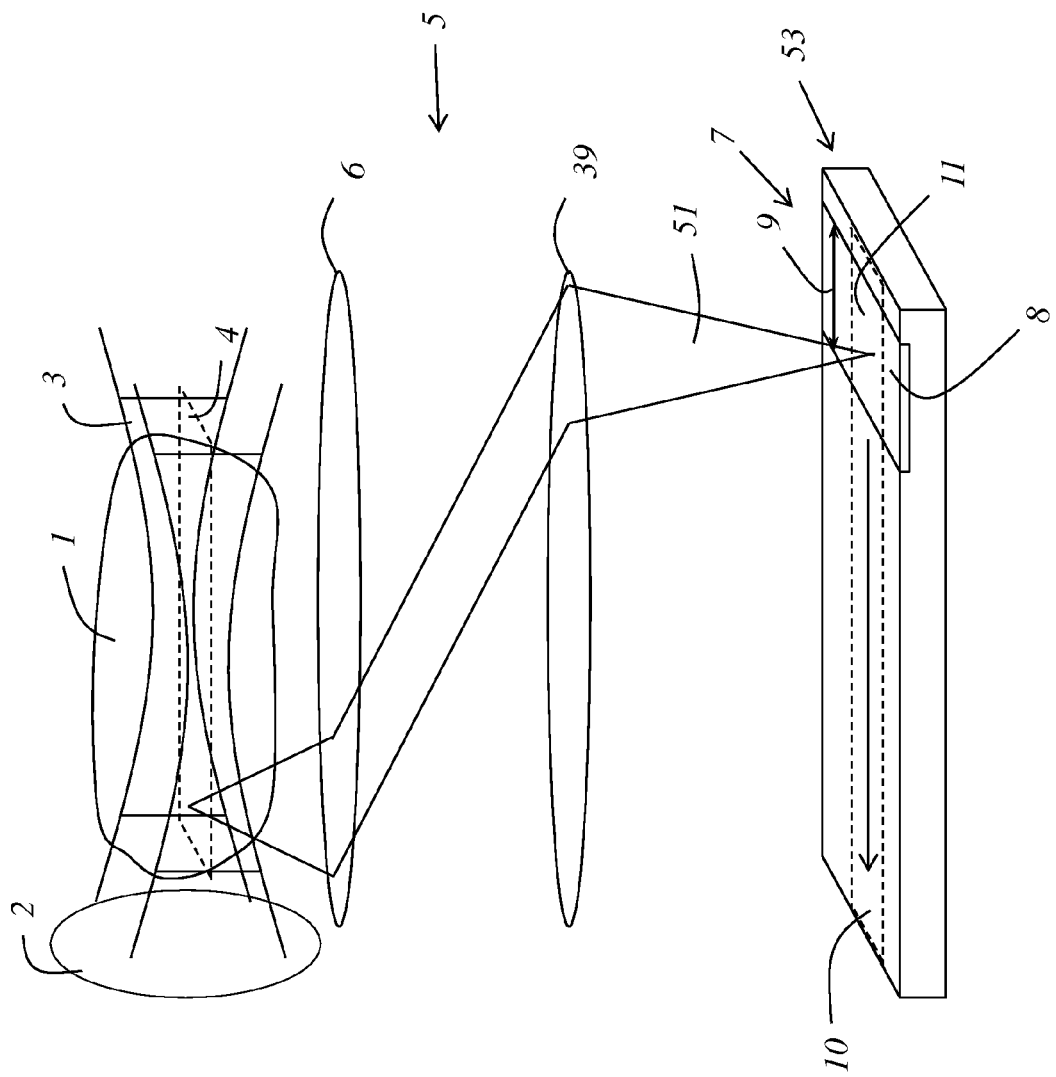
FIG. 1 is a detailed view of a first embodiment of a device according to the invention shown schematically.

An aspect of the present invention provides a method for examining a sample which makes it possible to produce images of higher contrast.

According to an embodiment, the method is characterized in that the detector is formed as a slit detector, and the direction of the slit width of the slit detector is oriented at an angle different from zero degrees with respect to the direction of the width of the image of the illumination strip projected in the detection plane.

Another aspect of the present invention provides a device for examining a sample which makes it possible to produce images of higher contrast.

According to an embodiment, the device is characterized in that the detector is formed as a slit detector, and the direction of the slit width of the slit detector is oriented at an angle different from zero degrees with respect to the direction of the width of the projected image of the illumination strip.

It has been found in accordance with an embodiment of the invention that the static illumination with a light sheet of which the focus is arranged in the center of the field of view and of which the depth of field is adapted to the size of the field of view along the illumination axis means that the thickness of the light beam is greater than is necessary if only smaller sections from the image region, in particular not disposed centrally, are of interest. The inventors have discovered in particular that in the prior art a light sheet that is thicker than necessary to illuminate the small section of interest is always used.

As will be explained further below in greater detail, an embodiment of the present invention makes it possible to always use a thinner illuminating light beam, in particular a thinner light sheet, to illuminate the region of interest and to utilize this in respect of a production of images of higher contrast. This can be implemented in particular in that the illuminating light beam is focused more strongly, which results in a thinner focus region, which is also shorter in the direction of light propagation, but which also results in a greater thickness of the illuminating light beam outside the focus region, wherein, however, exclusively the detection light originating from the focus region is detected on account of the particular orientation of the slit detector. By displacing the focus region within the illumination plane and/or within the sample, a greater area of interest of the sample can also be projected successively with high contrast.

In a particular embodiment, the direction of the slit width of the slit detector is oriented at an angle of 90 degrees (right angle) with respect to the direction of the width of the projected image of the illumination strip. In particular, an embodiment of this type makes it possible advantageously to detect exclusively the detection light originating from the focus region of the illuminating light beam.

The slit detector can be implemented in different ways.

By way of example, the slit detector can be part of an area detector. In particular, it can be advantageous that the slit detector is the actively switched part of an area detector arranged in the detection plane, for example a CMOS detector or sCMOS detector. It is advantageously possible, by way of example, to read out only part of the area detector, specifically the part corresponding precisely to the slit detector (actively switched part), whereas the other parts of the area detector, specifically the parts disposed outside the slit detector, are not read out (part not actively switched).

In an embodiment of this type, mechanical components, such as a slit diaphragm, are avoided, which is advantageous in particular if the slit detector is to be displaced in the detection plane. In an embodiment of this kind, specifically the area detector can remain stationary, in particular relative to the detection objective and/or the illumination objective and/or the sample and/or relative to the incident detection light, wherein different parts of the sensor area of the area detector, which then form the slit detector, are actively switched in chronological succession in such a way that exclusively the detection light incident on the actively switched part is detected, whereas detection light incident on the inactively switched parts of the area detector is not detected.

If the parts of the area detector actively switched in direct chronological succession are disposed spatially directly adjacently, this results in a spatially uninterrupted movement of the slit detector, without having to move mechanical components for this purpose. Specifically, for example, a region of actively switched pixels can run along the sensor uniformly and synchronously with the illuminating beam. In this respect, an embodiment of this kind has the particular advantage of a long service life, because movement-induced wear, for example of mechanical diaphragms, is avoided.

In a particular embodiment, the slit detector is moved in the detection plane. In particular, it can be provided advantageously that the slit detector is moved in the detection plane in the direction of the slit width and/or that the slit detector is moved by successive active switching and inactive switching of adjacent parts of the area detector in the detection plane. It is provided in a very particularly advantageous embodiment that the parts of the area detector actively switched in chronological succession overlap. This is therefore particularly advantageous because it enables a uniform movement of the light sheet along the illumination direction. This also leads to a constant effective thickness of the illuminated region over the entire field of view.

In a particular embodiment, the slit detector is moved in the detection plane by successive active switching and inactive switching of adjacent parts of an area detector in the direction of the slit width, i.e. perpendicularly to the direction of the longitudinal extent of the passage region of the slit detector and in particular perpendicularly to the width of the image of the illumination strip projected onto the detection plane. Here, as will be explained in greater detail further below, it can be provided in particular that the slit detector on the one hand and the illuminating light beam and/or the position of the focus of the illuminating light beam in the direction of propagation on the other hand are moved in a manner synchronized with one another—simultaneously or one after the other in a mutually coordinated movement rhythm.

As already mentioned, it can be provided advantageously that the slit detector is the actively switched part of an area detector arranged in the detection plane, for example of a CMOS detector or sCMOS detector, wherein it is possible in particular to read out only part of the area detector, specifically the part corresponding precisely to the slit detector (actively switched part), whereas the other parts of the area detector, specifically the parts disposed outside the slit detector, are not read out (part not actively switched).

Alternatively, the slit detector can comprise an area detector arranged in the detection plane, which area detector is arranged downstream of a slit diaphragm, in particular a mechanical slit diaphragm, of which the direction of the slit width is oriented at an angle different from zero degrees with respect to the direction of the width of the projected image of the illumination strip. In particular, so as to be able to move the slit detector, this slit diaphragm can be embodied for example by a mechanical shutter curtain, as is used in single-lens reflex cameras. The area detector in this embodiment can be active in respect of its entire sensor area, in particular also whilst the slit diaphragm and/or the illuminating light beam and/or the focus of the illuminating light beam are/is moved.

Also in an embodiment of the slit detector having a slit diaphragm, it can be provided that the slit detector is moved in the detection plane relative to the incident detection light, in particular in the direction of the slit width, in particular by displacement of the slit diaphragm.

The slit diaphragm can be embodied particularly advantageously also as a non-mechanical component. For example, it can be embodied as a mirror/absorber, for example based on liquid crystals, that can be switched in portions. It is particularly advantageously connected to spectral filters.

As already mentioned, it can be advantageously provided that the illuminating light beam, during the detection, is moved relative to the sample in the illumination plane. For this purpose, a beam deflection means adjustable in respect of the deflection angle can be used, for example. A beam deflection means of this kind can comprise at least one mirror galvanometer, for example. In particular, the beam deflection device of a scanning microscope provided anyway, in particular of a confocal scanning microscope, can also be used, for example; this is the case in particular if the device according to the invention is produced by retrofitting of a scanning microscope or the method according to the invention is carried out with the aid of a scanning microscope.

In particular, in order to examine the entire field of view successively, the illuminating light beam, during the detection, can be moved in the illumination plane perpendicularly to the direction of propagation of the illuminating light beam. In particular, the illuminating light beam, during the detection, can be moved continuously back and forth in the illumination plane perpendicularly to the direction of propagation of the illuminating light beam. This can be implemented in particular in such a way that the illuminating light beam is moved back and forth continuously perpendicularly to the direction of propagation of the illuminating light beam over the entire width of the field of view, wherein, each time it traverses the width of the field of view, the slit detector is displaced in the direction of propagation or opposite the direction of propagation, in particular connected to a corresponding, simultaneous displacement of the focus of the illuminating light beam. In this way, the entire field of view can be projected successively.

The device according to the invention can comprise advantageously a control device, in particular an electronic and/or computer-based control device, which moves the slit detector in the detection plane and the illuminating light beam in the illumination plane at the same time or an alternation, in particular synchronously with one another.

In particular, it can be provided advantageously that image data is obtained successively in this way in different sample planes, in particular parallel to one another, in order to obtain a 3D stack of image data.

It is also possible that the slit detector and the illuminating light beam are moved, respectively, in the detection plane and in the illumination plane simultaneously or in alternation, and/or that the slit detector and the illuminating light beam are moved, respectively, in the detection plane and in the illumination plane synchronously.

As already discussed above, the method can be implemented advantageously in such a way that the common region of intersection of the image of the illumination strip projected onto the detection plane and of the slit detector defines a detection region that is moved during the detection, for example by means of an electronic and/or computer-based control device. In particular, it can be provided advantageously that the region of intersection is moved during the detection along a predefined or predefinable movement pattern. In this way, the entire field of view by way of example can be scanned successively. It is also possible in this way to examine exclusively a sub-region or a plurality of sub-regions of the sample, which can have a predefined or predefinable form.

As already mentioned, it can also be provided advantageously that the sample is examined in different sample planes. To this end, the sample is displaced relative to the illumination plane—and/or conversely the illumination plane is displaced relative to the sample, for example with a beam deflection means of which the deflection direction can be adjusted. In this respect, it can also be provided advantageously that sub-regions arranged in different sample planes are examined in succession or cyclically.

In particular, this can be implemented for example in such a way that firstly a (two-dimensional or three-dimensional) overview image of the sample is produced (for example with low resolution and/or brightness) and then at least one sample region of interest (sub-region) is defined. The illumination strip and the slit detector are then positioned so that the sample region of interest is illuminated with the focus of the illuminating light beam and the detection light originating from the sample region of interest contacts the detection plane within the detection region.

It is also possible in particular that the sample region of interest is larger than the focus of the illuminating light beam. The sample region is then projected in that—as described above in relation to an entire field of view plane—the illuminating light beam and the slit detector are moved synchronously. In particular, it can also be provided advantageously that the size of the focus of the illuminating light beam is smaller than the sample region of interest, so as to be able to thus scan the sample region of interest with high resolution.

In particular, a three-dimensional overview image of the sample can be produced by examining different sample planes in succession. At least one sample region of interest is then defined in one of the sample planes as a sub-region of the sample plane in question, wherein the illuminating light beam, in particular the focus of the illuminating light beam, and the slit detector are positioned so that the detection light originating from the sample region of interest is incident on the detection plane within the detection region.

In a particularly advantageous embodiment, at least one adjustable beam deflection means is arranged in the detection beam path and makes it possible to displace the projected image of the region of interest into the detection plane into the center and/or into the readout region of the area detector arranged there. This has the very particular advantage that the readout speed is significantly increased in this way. This does not only concern (although this is possible) enlarging the central region of the field-of-view using zoom and shift optics. Rather, it involves in particular projecting various regions of interest of the sample with high resolution, which is not possible with the devices known from the prior art on account of the thickness of the light sheet of these devices mentioned at the outset. Rather, the present invention makes it possible to examine a region of interest or successively a plurality of regions of interest with high resolution, without having to move the sample for this purpose.

A displacement of the projection of the region of interest into the center and/or into the readout region of the area detector arranged in the detection plane is advantageous in particular if the readout speed (for example the camera readout speed and/or the frame rate) for regions of interest of identical size is dependent on the position of the projection of the regions of interest on the area detector, for example as in the case of currently conventional sCMOS detectors.

In particular, an area detector can be used advantageously, in which the readout speed is dependent exclusively on the number of the pixels to be read out, regardless of the position thereof within the detector. By means of an area detector of this type, a multiplicity of regions of interest can be read out at the same time, wherein the readout speed is dependent exclusively on the number of pixels to be read out for detection of all regions of interest. With the use of an area detector of this type, it is possible to dispense with the displacement of the projected image of the region of interest into the center of the area detector arranged in the detection plane.

As already mentioned, the overview image can be produced with reduced image quality, for example with a thicker light sheet and/or an increased depth of field of the detection optics (for example by reducing the aperture). The detection objective for the overview image can also be swapped for one with lower magnification. In particular, it can be provided advantageously that the overview image is obtained in a mode which enables a sufficient image quality for selection of a (sub-)region of interest or a plurality of (sub-Substitute Specification (Clean Version) (Client Ref 10253-P-WO-US-CON)) regions of interest, but in which the sample might be damaged to a small extent, for example by reducing the aperture of the illumination and detection objective.

The following example is provided in this respect: the area detector by way of example can have a sensor area of 2048×2048 pixels, which can be read out at 100 Hz. The user or an automatic image recognition software by way of example selects a region or a plurality of regions of interest with a size of 205×205 pixels. The small region can be read out a much quicker speed, specifically approximately 10 times quicker, than the total area detector, because for example for conventional sCMOS sensors the readout speed is dependent on the number of rows. Even if the region of interest were to comprise 205×2048 pixels, the readout speed would be this high, since the speed is scaled only with the number of rows. An area detector of which the readout speed is dependent only on the number of pixels to be read out would be even quicker, in this case 100 times quicker.

In a particularly advantageous embodiment, the projected image of a region of interest is positioned on the area detector, in particular by means of an adjustable beam deflection means arranged in the detection beam path, so that the projected image is positioned close to the region of the readout location of the area detector. In some area detectors the distance of the row located farthest from the readout location, which row has to be read out for detection of the region, is important for the rapid detection of a region of interest.

If the user were to select five regions in the illumination plane, these could be recorded 20 times quicker. This improvement of the speed compared to the selection of regions of interest (ROIs) in a light sheet microscope according to the prior art also has the advantage that the small regions can be examined with a very much higher image quality, since they are illuminated by a smaller (axially shorter focus), but thinner light sheet, of which the lateral and axial dimensions correspond approximately to those of the ROI. If the ROI is larger than the focus of the illuminating light beam, in particular light sheet, the beam for examining the ROI, as described above, must be displaced synchronously with the slit detector.

If the smallest ROI is smaller than the dimensions of the focus of the illuminating light beam, the potential of the method according to the invention is of course not fully utilized. If the focus of the illuminating light beam is longer, it is not as thin as it could actually be, and therefore the image quality is not optimal. As already mentioned, in this case, however, the illuminating light beam can be shifted along the illumination axis and to this end can be moved synchronously with the readout region.

If the focus of the illuminating light beam is wider, this results in an unnecessary additional illumination of adjacent regions in the sample, and if by contrast it is too narrow, the resultant illumination strength/intensity can be damaging to the sample. The dimensions of the focus of the illuminating light beam and/or of the slit detector are preferably adapted to the respective requirements.

In a particular embodiment, a plurality of regions of interest are defined, which are examined one after the other and/or continuously in quick succession. The plurality of regions of interest can be disposed in a single sample plane or can be distributed over a number of sample planes.

As already mentioned, the illuminating light beam can have a focus within the illumination strip. In particular, it can be provided advantageously that the illuminating light beam is focused by means of an illumination objective in such a way that the illuminating light beam has a focus within the illumination strip.

As also already mentioned, it is particularly advantageous if the focus is moved synchronously and in accordance with the movement of the slit detector, for example by means of an electronic and/or computer-based control device. In particular, it can be provided advantageously that the region of intersection of the image of the illumination strip projected onto the detection plane and of the slit detector defines a detection region which, during the detection, is moved along a predefined or predefined movement pattern, wherein the focus of the illuminating light beam is moved synchronously, in such a way that the detection light originating from the sample region illuminated by the focus is always incident on the detection plane within the detection region.

It can be provided by way of example that the illumination objective is arranged movably relative to the sample by means of a shifting device, so as to be able to displace the focus. In particular if the illumination objective is embodied as an air-immersion objective, the physical displacement of the illumination objective in itself is a simple and very useful solution for displacing the focus in the described way. A displacement of the illumination objective can be implemented for example by a customary motor, for example in an objective revolver of a microscope stand, or for example by a piezo adjuster.

In particular if the illumination objective is formed as a water-immersion objective or as an oil-immersion objective, a shifting of the focus by means of a focus adjustment device arranged in the beam path of the illuminating light beam is advantageous, since it allows the relative position of illumination objective and sample to remain unchanged during the shifting process.

In a particularly advantageous embodiment, the focus of the illuminating light beam is moved by changing the length of the optical light path of the illuminating light beam. For this purpose, a focus adjustment device can be provided in particular, which has at least one arm of which the optical length is adjustable. Alternatively or additionally to the shifting of a focus of the illuminating light beam, a zoom optics for example or at least one lens with variable focal length can be provided. A focus adjustment device of this kind has the advantage that the illumination objective can remain stationary relative to the sample, so that an influencing of the sample, in particular if an immersion means is used, by a relative movement of the illumination objective is avoided.

The focus adjustment device can comprise in particular a polarization beam splitter which allows the linearly polarized illuminating light beam coming indirectly or directly from an illumination device to pass into an adjustment arm which is terminated by a deflection mirror and in which a tube lens, a $\lambda/4$ plate, and an objective are arranged. The deflection mirror arranged perpendicularly to the direction of propagation of the illuminating light beam is mounted displaceably along the optical axis. The deflection mirror reflects back the illuminating light beam, so that this illuminating light beam, after passing again through the objective, the $\lambda/4$ plate and the tube lens, passes back to the polarization beam splitter. The illuminating light beam arriving again at the polarization beam splitter has a linear polarization direction rotated through 90 degrees on account of the fact that it has passed twice through the accordingly oriented $\lambda/4$ plate, and is therefore reflected by the polarization beam splitter to a further tube lens, which is arranged upstream of the actual illumination objective. By displacing the deflection mirror, the position of the focus in the illumination plane can be displaced along the direction of propagation of the illuminating light beam.

As already mentioned, the illuminating light beam in a very particularly advantageous embodiment is formed at least in the region of the illumination strip as a light sheet. An embodiment of this kind has the very particular advantage that a thin flat region of the illumination plane is illuminated and is projected on the whole with high contrast, without the sample regions disposed thereabove and therebelow also being illuminated.

The light sheet can be produced for example from an illuminating light beam with an originally round cross section, in particular using a cylindrical optics. In the sense of the present invention, a cylindrical optics is understood to mean any astigmatic optics and/or any optics that is focused more heavily in a direction perpendicular to the direction of propagation of the illuminating light beam than in another direction perpendicular to the direction of propagation of the illuminating light beam.

However, other illuminating light beams are also possible, in particular in conjunction with a device for moving the beam in the illumination plane perpendicularly to the direction of propagation of the illuminating light beam. These include Bessel beams, Mathieu beams, Airy beams, and the coherent superposition of the aforementioned beams.

It is also possible to excite fluorescence in the sample via non-linear effects, in particular two-photon absorption.

The device according to the invention can comprise, for example, an illumination objective and a detection objective, wherein the optical axis of the illumination objective is oriented perpendicularly to the optical axis of the detection objective.

In a particularly advantageous embodiment, the optical axis of the illumination objective and the optical axis of the detection objective are oriented parallel or coaxial to one another. Alternatively or additionally, it can also be provided that the detection objective and the illumination objective are oriented in opposite directions to one another and opposite one another and/or that a sample holder is arranged spatially between the detection objective and the illumination objective, which sample holder defines an examination position for a sample to be examined. An embodiment of this type has the particular advantage that the optical device can be embodied in a particularly compact and robust manner, and that the examination position for the sample is particularly easily accessible, so that a rapid and precise, successive bringing of the samples into the examination position is made possible.

The device according to the invention can comprise advantageously a deflection means, which deflects the illuminating light beam, once this has passed through the illumination objective, in such a way that the illuminating light beam runs in the illumination plane. In particular, the deflection means can be arranged in such a way that the deflected illuminating light beam has an angle different from zero degrees with respect to the optical axis of the illumination objective and/or of the detection objective. In particular, the illumination plane can be oriented perpendicularly to the optical axis of the illumination objective.

In particular, it can be provided advantageously that the illuminating light beam, in particular shaped to form a light sheet, firstly runs in the vertical direction through the illumination objective and is then deflected in the horizontal direction by the deflection means, so as to illuminate the sample in the sample plane along the illumination strip. The detection light originating from the illumination strip, in particular fluorescent light, preferably runs in the vertical direction through a detection objective. A construction of this type enables the use of upright or inverse standard microscope stands for production of the optical device according to the invention.

In a very particularly advantageous embodiment, it is provided that the illumination objective and the deflection means, which for example can comprise one or more deflection mirrors, are arranged movably relative to one another, so as to be able to move the illuminating light beam relative to the sample. Alternatively or additionally, it can also be provided that the deflection means is secured, in particular movably, to the detection objective.

A device that is suitable for carrying out the method according to the invention can be constructed advantageously on the basis of a scanning microscope, in particular a confocal scanning microscope. In particular the use of an inverse microscope stand lends itself here. In this respect, the use of a scanning microscope (possibly provided anyway in a laboratory) is particularly advantageous for carrying out the method according to the invention.

In a very particularly advantageous embodiment, the above-described method is carried out a number of times simultaneously on the same sample. By way of example, this has the very particular advantage that different sample regions can be examined at the same time. These sample regions can be disposed in the same sample plane or also in different sample planes. In this respect, the method can also be carried out a number of times at the same time for examination of the same sample, as described above in particular with respect to the illumination of an illumination strip and the specific arrangement and design of the slit detector. In particular, it can be provided for this purpose that the illumination objective focuses a number of illuminating light beams on the sample at the same time. These illuminating light beams by way of example can have different wavelengths, so as to excite different fluorophores, which emit detection light in different spectral ranges. The projection can take place on different sensor halves, which are each arranged downstream of matching spectral filters. A crosstalk, that is to say background production in the other image, respectively, can thus be effectively suppressed.

In a particular embodiment, the sample is illuminated in the illumination plane or in another illumination plane, in particular parallel to the first illumination plane, along at least one further illumination strip by at least one further illuminating light beam, which propagates along the further illumination strip. In addition, it can be provided that the further detection light originating from the further illumination strip is projected into the detection plane and is detected by at least one further slit detector, wherein the direction of the slit width of the further slit detector is oriented at an angle different from zero degrees with respect to the direction of the width of the image of the further illumination strip projected into the detection plane. The at least two illuminating light beams can have different wavelengths, as described above. In a very particularly advantageous way, the slit detector and the further slit detector can be parts of the same area detector. Alternatively or additionally, it is also possible that the slit detector is an actively switched part of an area detector arranged in the detection plane, and that the further slit detector is another actively switched part of the same area detector.

In particular in such an embodiment, a plurality of regions of interest of the sample can be defined, which are illuminated simultaneously, wherein the detection light originating from the illuminated illumination strip is detected simultaneously by means of the slit detectors.

FIG. 1 is a detailed view shown schematically of a first embodiment of a device according to the invention for examining a sample 1. The device contains an illumination objective 2, which focuses an illuminating light beam 3 formed as a light sheet. Specifically, the sample 1 is illuminated by the illuminating light beam 3 in an illumination plane along a region of the sample, specifically along an illumination strip 4, wherein the illuminating light beam propagates along the direction of the longitudinal extent of the illumination strip 4.

The device additionally has a detection optics 5, which contains a detection objective 6 and which can additionally contain further beam-shaping elements, in particular lenses, in particular a tube lens 39, which for the sake of improved clarity is illustrated in a simplified manner in FIG. 1. The detection optics 5 projects the detection light originating from the illumination light strip into a detection plane, in which a detector 7 is arranged. The detector 7 is formed as a slit detector 8, wherein the direction of the slit width 9 (illustrated as a double-headed arrow) of the slit detector 8 is oriented perpendicularly to the direction of the width of the projected image 10 of the illumination strip 4. The slit detector 8 is formed by the actively switched part of an area detector 53.

The common region of intersection 11 of the image 10 of the illumination strip 4 projected onto the detection plane on the one hand and of the slit detector 8 on the other hand defines a detection region. The detection light 51 which is incident on the area detector 53 outside the slit detector 8 is not detected, because the area detector 53 is not read out there. Outside the projected image 10 of the illumination strip 4, no detection light 51 contacts the area detector 53.

Since merely the region of intersection 11 is therefore relevant for the detection, the illuminating light beam 3 can have an axially very short and therefore very thin focus, which has a very particularly advantageous effect on the quality of the projection of the sample, because the sample planes above and below the relevant sample plane currently to be examined are not illuminated and therefore no fluorescence light originates from these sample planes.

Figure 2:
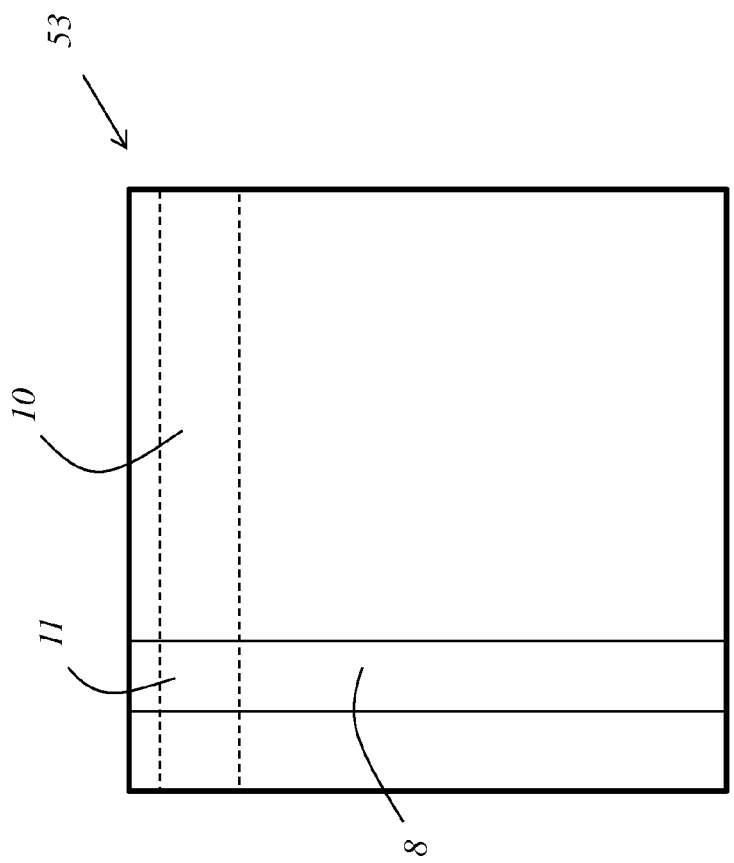
FIG. 2 is a plan view of the area detector of the first embodiment.

FIG. 2 is a plan view of the area detector 53 of the first embodiment, which can be formed for example as a CMOS detector or as an sCMOS detector. It can be clearly seen that the projected image 10 of the illumination strip 4 is oriented perpendicularly to the direction of the longitudinal extent of the slit detector 8. The area detector 53 by way of example can have a sensor area measuring 2048×2048 pixels, wherein merely the pixels of the region of intersection 11, or alternatively exclusively the pixel rows 8 that run through the region of intersection 11, are read out.

Figure 3:
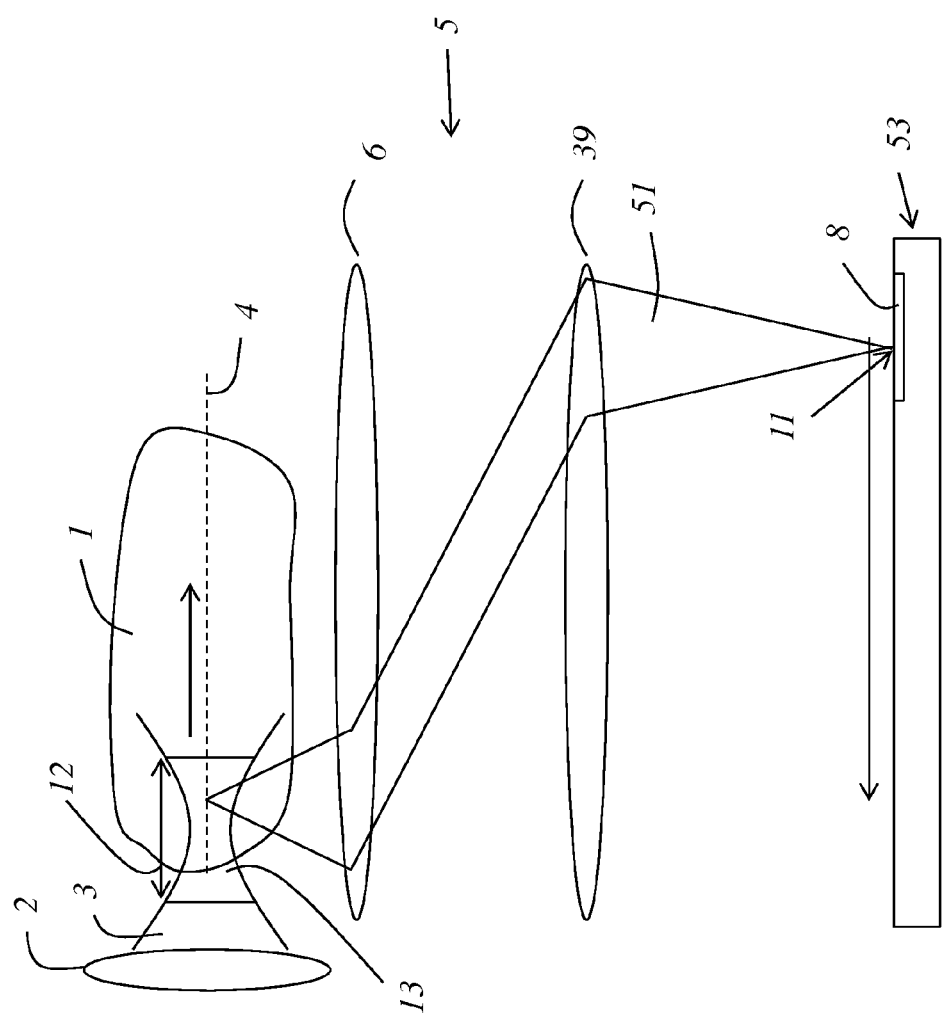
FIG. 3 is a detailed view of a second embodiment of a device according to the invention shown schematically.

FIG. 3 is a detailed view shown schematically of a second embodiment of a device according to the invention which is identical to the device illustrated in FIG. 1 in terms of the basic construction.

Figure 4:
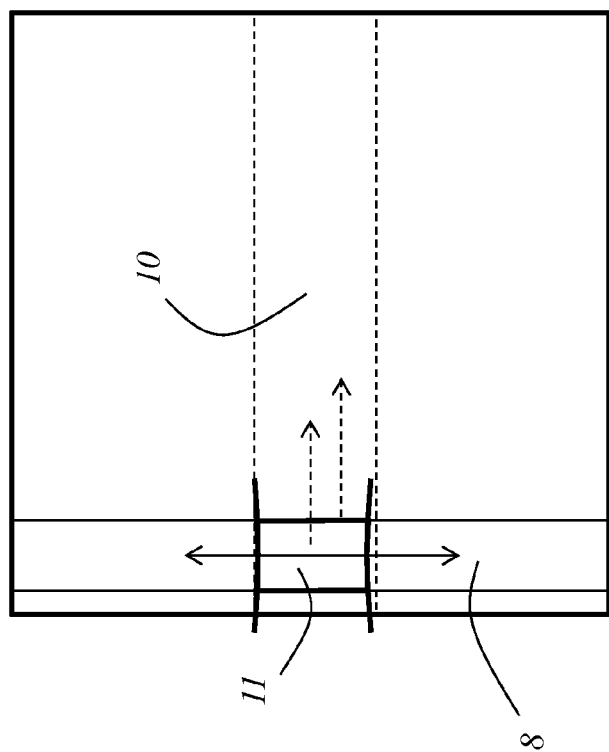
FIG. 4 is a plan view of the area detector of the second embodiment.

The illuminating light beam 3 is in this embodiment formed as a light sheet (light sheet plane perpendicular to the drawing plane and parallel to the optical axis of the illumination objective 2). As already mentioned, the focus length 12 of the focus 13 of the illuminating light beam 3 can be particularly short because merely the region of intersection 11 of the projection of the illumination strip 4 and of the slit detector 8 is relevant for the detection, which can be seen particularly clearly in FIG. 4. The focus 13 of the illuminating light beam 3 can therefore be particularly thin, which very significantly increases the quality of the projection of the sample 1. In order to project the sample 1 along the entire illumination strip 4, the focus 13 is displaced in the direction of propagation, for example with the aid of a focus adjustment device. In a simple variant, the illumination objective 2 is for this purpose displaced along the direction of propagation. Alternatively, an illumination objective 2 (or an illumination optics) having an internal focusing option can also be used. Similarly, the detection objective 6 can be moved in order to focus the detection light 51. Alternatively, a detection optics 5, in particular a detection objective 6, having an internal focusing option can also be used.

Synchronously to the displacement of the focus 13, the slit detector 8 is displaced along the direction of the longitudinal extent of the projected image 10 of the illumination strip 4. It is ensured in this way that the detection light 51 originating from the focus region 13 is always incident on the slit detector 8.

As soon as the entire illumination strip 4 has been scanned, a new, in particular adjacent, illumination strip 4 is defined within the same sample plane, and this illumination strip 4 is then illuminated by the illuminating light beam 3 in the described manner. To this end, the illuminating light beam 3 is displaced in parallel relative to the sample in the illumination plane, for example by a beam deflection means adjustable in respect of the deflection angle. In this way, the entire illumination plane can be scanned successively in illumination strips.

Of course, it is also possible to scan the illumination plane in columns by firstly displacing the illuminating light beam 3 over the entire width of the illumination plane and then displacing the focus 13 in the axial direction and accordingly the slit detector 8. The region scanned in this way by the illuminating light beam 3 does not have to be rectangular in principle. Rather, the region illuminated by the illuminating light beam 3 can be adapted to the contours of the sample. In particular, it is also possible that the region illuminated by the illuminating light beam 3 encloses at least one non-illuminated region. In particular, the illumination pattern can also contain "holes".

In the embodiments shown in FIGS. 1 to 4, the slit detector 8, as already mentioned, can be part of an area detector 53, which for example can be formed as a CMOS detector or as an sCMOS detector. The slit detector 8 is formed in that merely part of the area detector 53, specifically the part of the area detector 53 corresponding precisely to the slit detector 8, is read out, whereas the rest of the parts of the area detector 53, specifically the parts that lie outside the slit detector 8, are not read out. It is alternatively also possible to read out the entire area detector 53 continuously and to arrange, upstream thereof, in order to provide a slit detector 8, a displaceable mechanical slit diaphragm 14, which for example can be formed similarly to the shutter curtain of a camera. A solution of this kind is shown schematically in FIG. 5. In this embodiment as well, the focus 13 of the illuminating light beam 3 (in the direction of light propagation) and the mechanical slit diaphragm 14 are moved synchronously with one another. The light passing through the mechanical slit diaphragm 14 is projected onto the area detector 53 by means of a telecentric optics 61.

Figure 5:
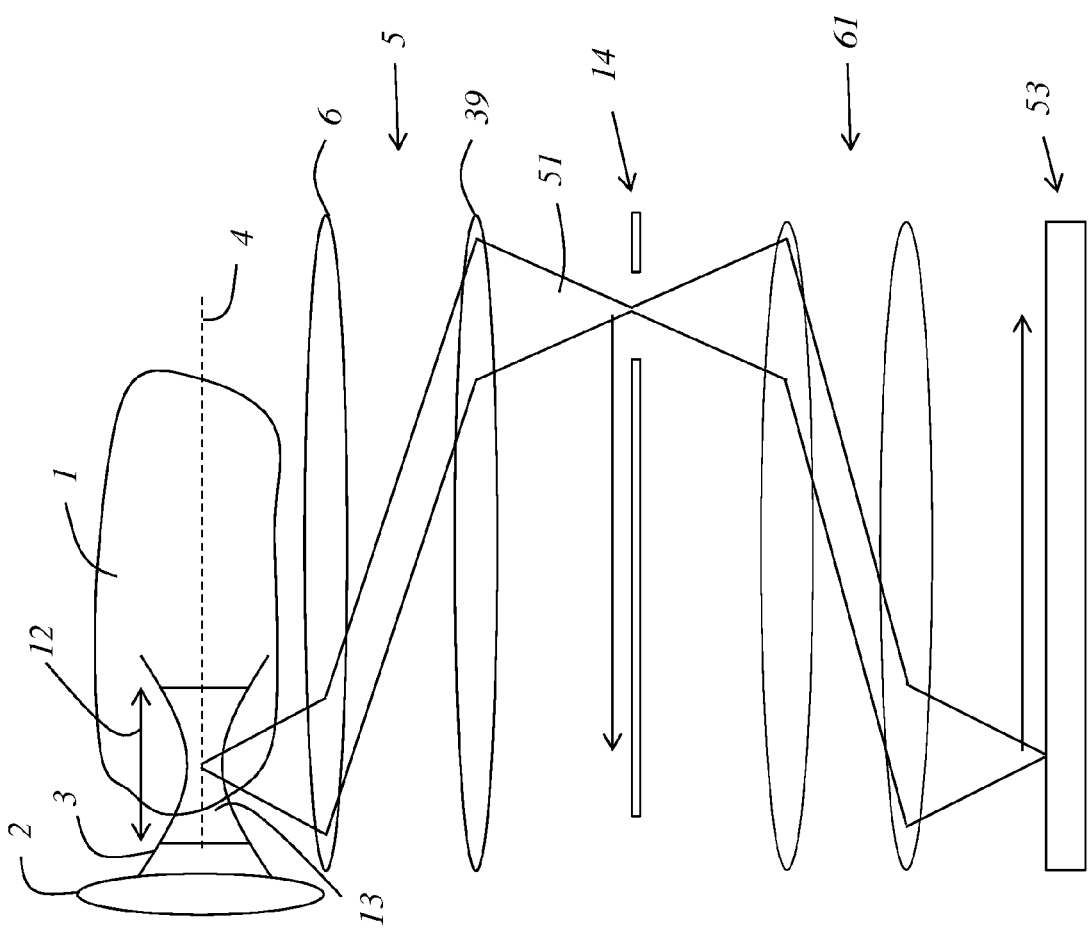
FIG. 5 is a detailed view of a third embodiment of a device according to the invention shown schematically.

Both the embodiment shown in FIG. 3 of the moved slit detector and the embodiment shown in FIG. 5 of a moved slit detector could also be referred to as a "rolling shutter".

Figure 6:
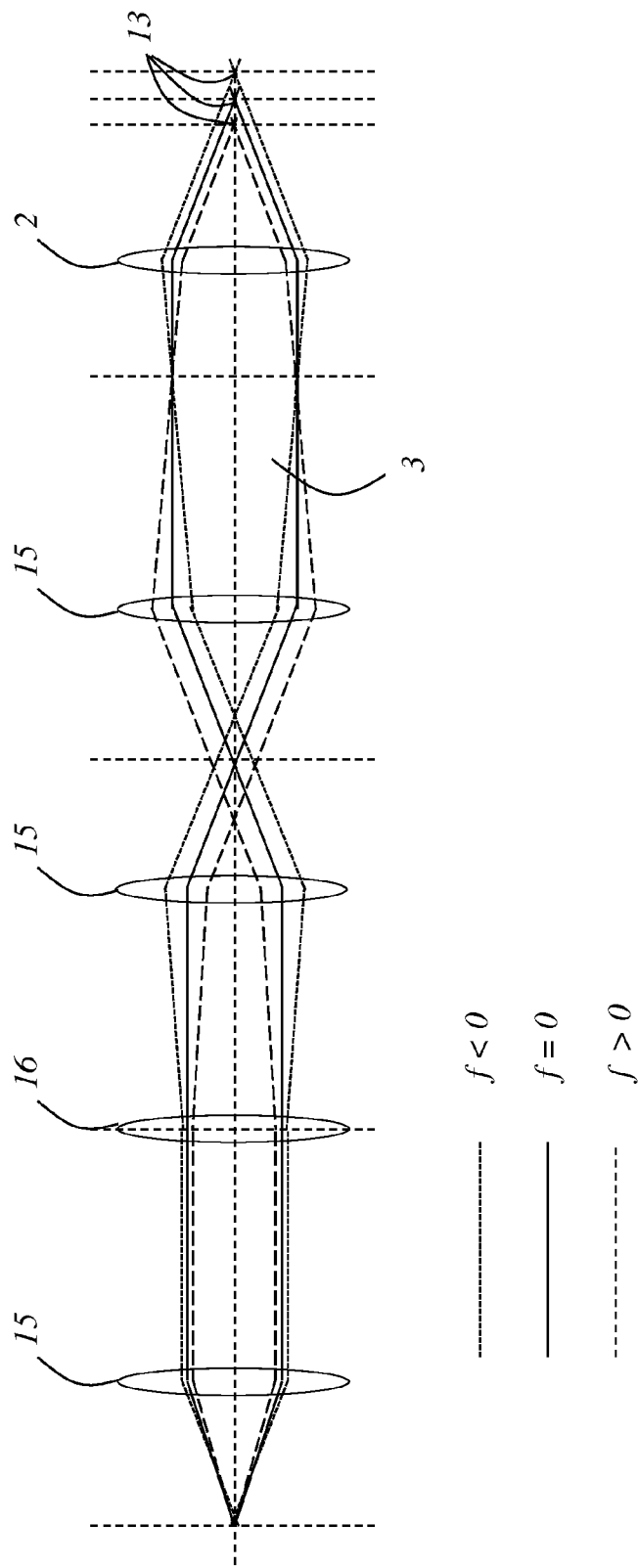
FIG. 6 is a schematic view of an embodiment of a focus adjustment device for shifting a focus of the illuminating light beam.

FIG. 6 schematically shows an embodiment of a focus adjustment device for displacing a focus 13 of an illuminating light beam 3. The focus adjustment device, besides a plurality of fixed lenses 15, also includes a lens 16 adjustable in respect of its focal length f. FIG. 6 shows different beam paths and different positions of the focus 13 after the illumination objective 2 depending on different focal lengths f of the lens 16 adjustable in respect of its focal length f.

Figure 7:
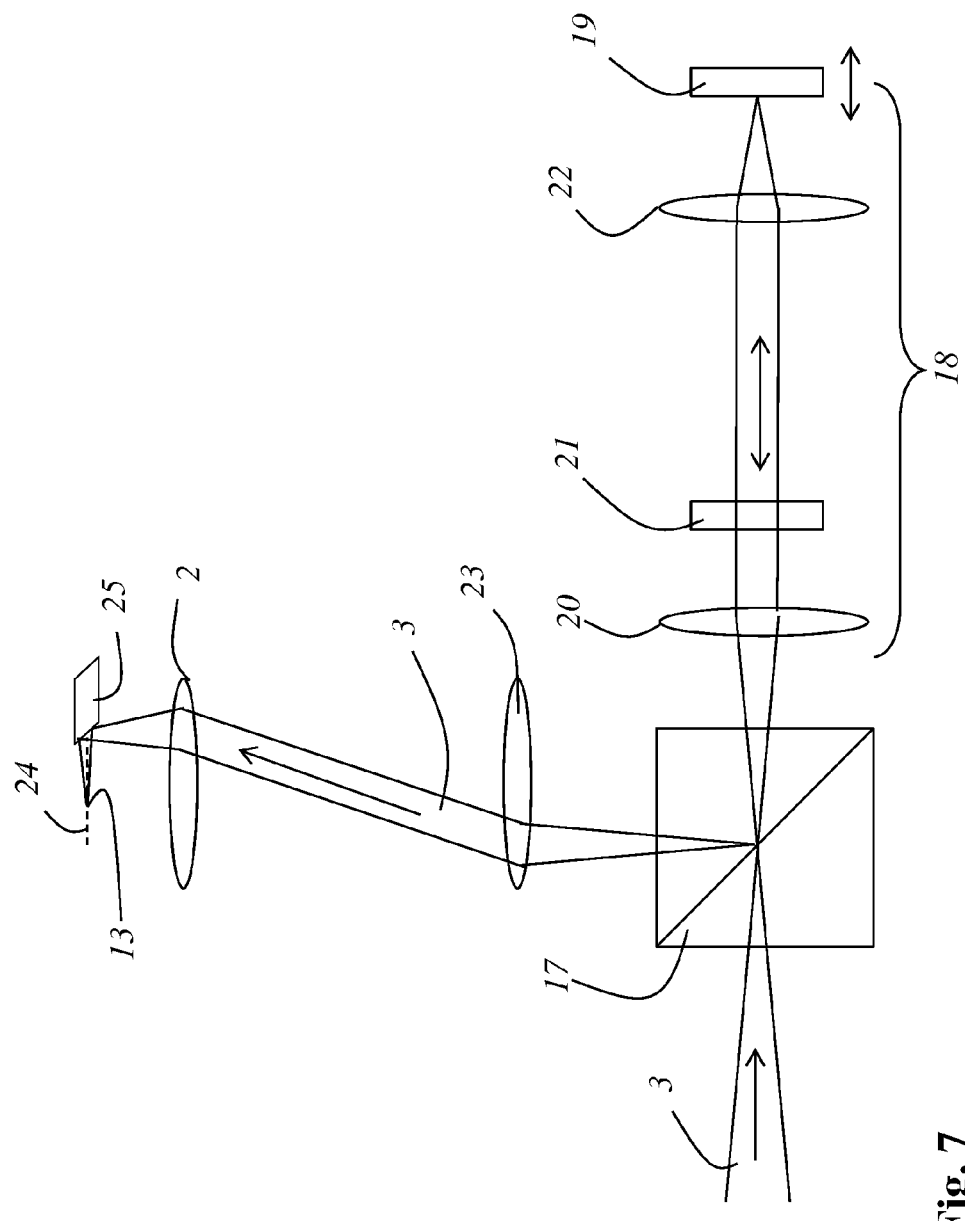
FIG. 7 is a schematic view of another embodiment of a focus adjustment device for shifting a focus of the illuminating light beam.

FIG. 7 schematically shows another embodiment of a focus adjustment device for displacing the focus 13 of an illuminating light beam 3. The focus adjustment device includes a polarization beam splitter 17, which allows an incident, linearly polarized illuminating light beam 3 to pass into an adjustment arm 18 of the focus adjustment device. The adjustment arm 18 is terminated by a deflection mirror 19 and includes a first tube lens 20, a λ/4 plate 21, and an objective 22. The deflection mirror 19 oriented perpendicularly to the direction of propagation of the illuminating light beam 3 is supported displaceably along the optical axis. The deflection mirror 19 reflects back the illuminating light beam 3, so that this passes back to the polarization beam splitter 17 after once again passing through the objective 22, the λ/4 plate 21, and the first tube lens 20. The illuminating light beam 3 arriving back at the polarization beam splitter 17 has a linear polarization direction rotated through 90 degrees on account of having passed twice through the accordingly oriented λ/4 plate 21, and is therefore reflected by the polarization beam splitter 17 to a further tube lens 23, which is arranged upstream of the actual illumination objective 2. By displacing the deflection mirror 19 along the optical axis, the position of the focus 13 in the illumination plane 24 can be displaced along the direction of propagation of the illuminating light beam 3, which after passing through the objective 2 was deflected by a deflection means 25. The optional deflection means 25 can be formed in particular as a mirror and can be secured to the detection objective 6. In this embodiment, a detection objective is preferably positioned at right angles to the illumination plane 24.

Figure 8:
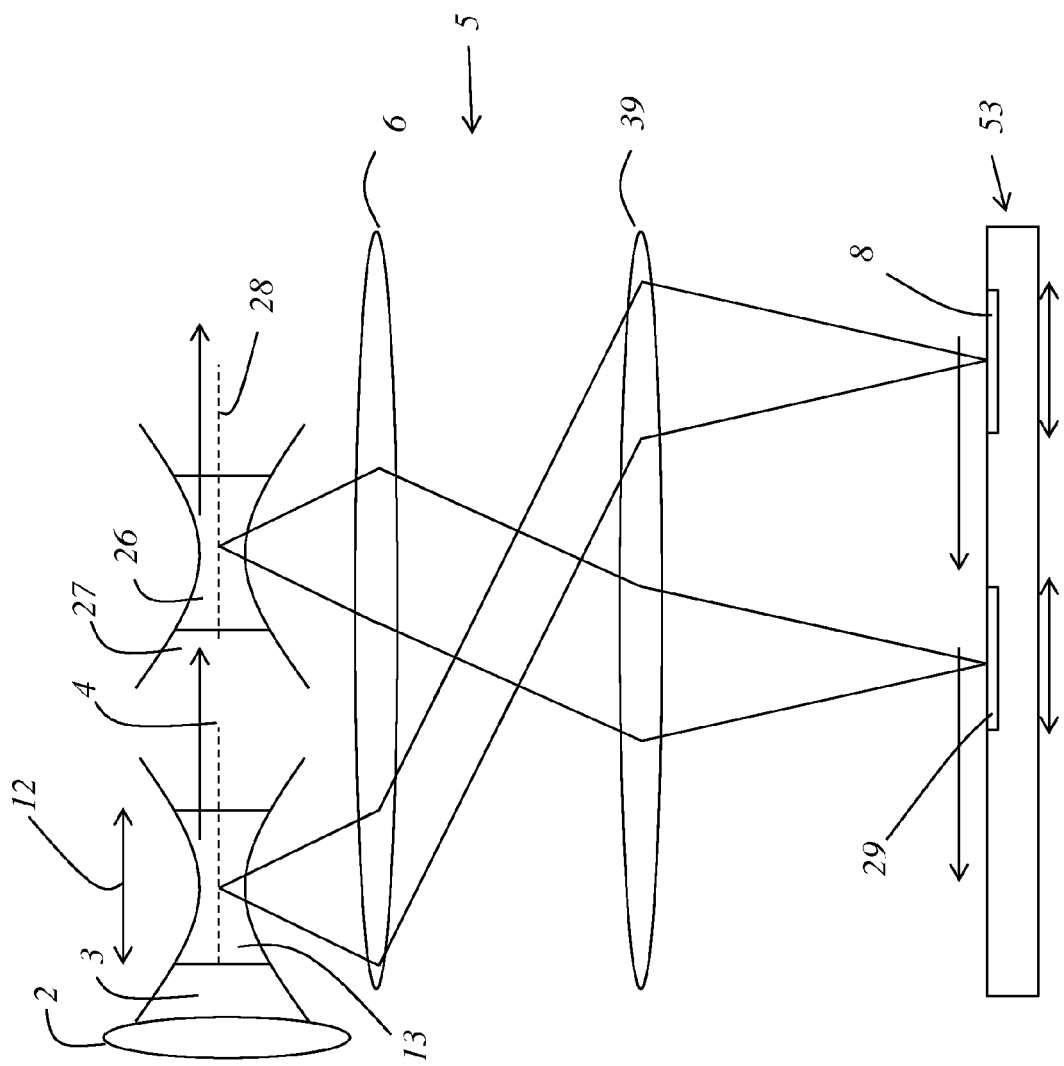
FIG. 8 is a detailed view of a fourth embodiment of a device according to the invention shown schematically.

FIG. 8 schematically shows a detailed view of a fourth embodiment of a device according to the invention, in which the sample 1 is illuminated by the focus 13 of an illuminating light beam 3 and additionally by the further focus 26 of a further illuminating light beam 27. Whereas the illuminating light beam 3 illuminates the sample in a sample plane along an illumination strip 4, the further illuminating light beam 27 illuminates the sample in the illumination plane along a further illumination strip 28. Both the illuminating light beam 3 and the further illuminating light beam 27 are focused by means of the same illumination objective 2.

The device comprises an area detector 53 with a slit detector 8 and a further slit detector 29. The slit detector 8, as already described above in respect of the other embodiments, is displaced synchronously with the focus 13 of the illuminating light beam 3 by sequential active switching of adjacent regions of the area detector 53, whereas the further slit detector 29 is displaced in a similar manner synchronously with the focus 26 of the further illuminating light beam 27.

The illuminating light beams 3, 27 can have different wavelengths, wherein the slit detectors 8, 29 can be arranged downstream of tailored chromatic filters. In particular, tailored chromatic filters can be integrated in upstream slit diaphragms.

Figure 9:
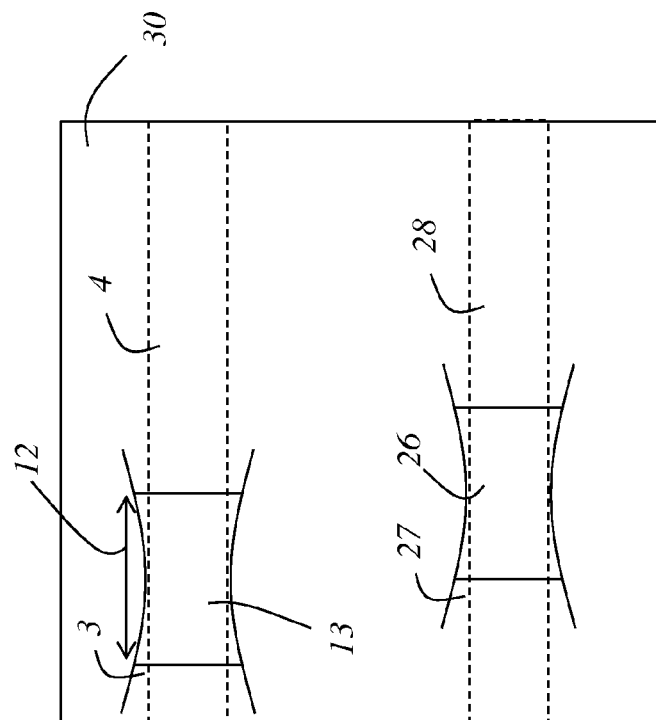
FIG. 9 is a plan view of the illumination plane of the fourth embodiment.
Figure 9:
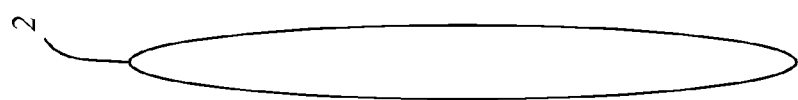
Figure 12:
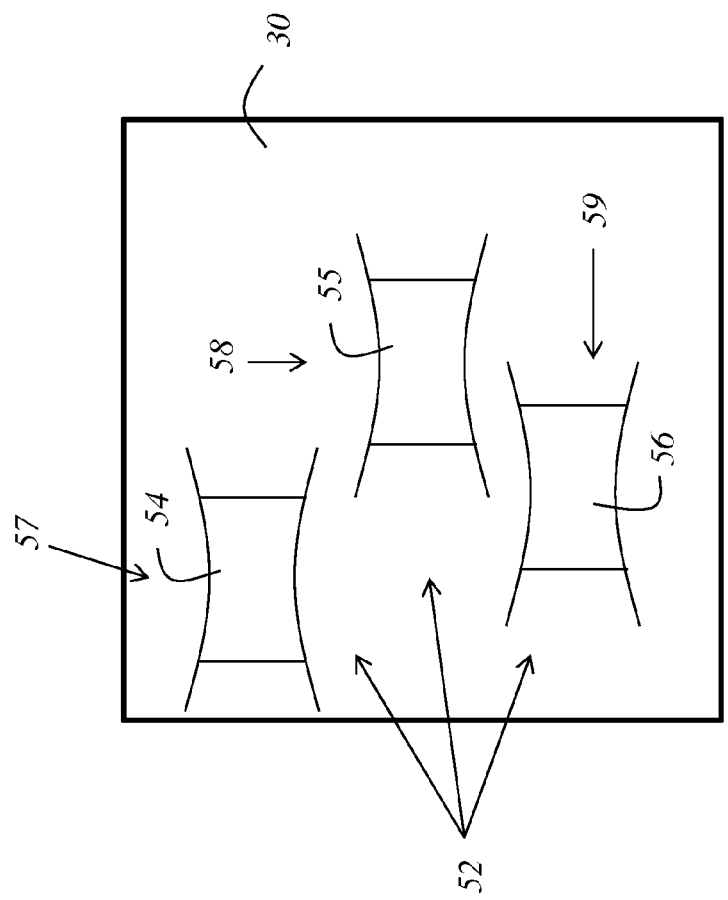
FIG. 12 schematically shows the simultaneous examination of a plurality of regions of interest of an illumination plane.

FIG. 9 is a plan view of the illumination plane 30 of the fourth embodiment. It can be seen that different illumination strips 4, 28 of the sample 1 are scanned on the one hand with the focus 13 of the illuminating light beam 3 and on the other hand with the further focus 26 of the further illuminating light beam 27. Of course, it is also possible to dispense with the axial movement of the focuses 13, 26 and to project regions of particular interest in a stationary manner simultaneously. This can also be implemented with an even greater number of illuminating light beams, this being indicated schematically in FIG. 12. There, different regions of interest 52 within the sample plane 30 are illuminated by the focuses 54, 55, 56 of a plurality of illuminating light beams 57, 58, 59, and the detection light originating from these regions of interest is detected by different slit detectors. The illuminating light beams 57, 58, 59 can be moved for example either jointly or separately by scanning means so as to be laterally offset and/or by tunable lenses so as to be offset along the illumination direction. A plurality of illuminating light beams can be produced simultaneously for example by a diffractive optical element and/or a spatial light modulator. The dimensions of the illuminating light beams 57, 58, 59 are either adapted to the size of the regions of interest 52 or are smaller than the regions of interest 52 and are scanned over the region. The illuminating light beams 57, 58, 59 can have the same or different wavelengths.

Figure 10:
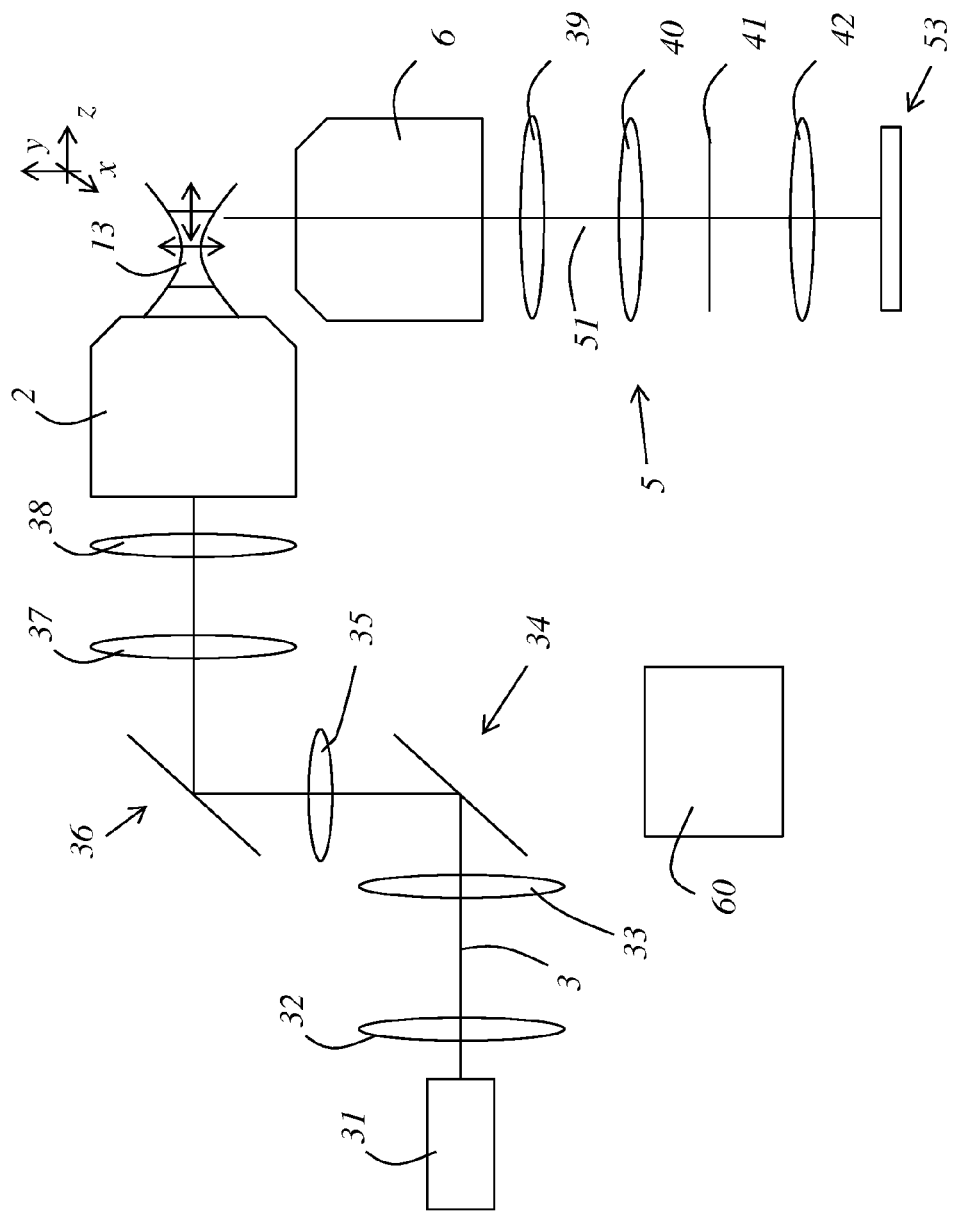
FIG. 10 is a schematic view of a fifth embodiment of a device according to the invention.

FIG. 10 schematically shows a sixth embodiment of a device according to the invention which comprises a light source 31 and an astigmatic optics 32 for producing a light sheet-like illuminating light beam 3. The astigmatic optics 32 is arranged upstream of a focus-displacement optics 33. After having passed through the focus-displacement optics 33, the illuminating light beam 3 reaches a first beam deflection means 34, which is adjustable in respect of the deflection angle and which is formed as an X scanner. The illuminating light beam 3 then passes via an intermediate lens 35 to a second beam deflection means 36, which is adjustable in respect of the deflection angle and which is formed as a Y scanner. After passing through a scanning optics 37 and a tube optics 38, the illuminating light beam 3 is focused by an illumination objective 2 into the sample.

The detection light 51 originating from the sample passes via a detection optics 5, which comprises a detection objective 6 as well as a further tube lens 39 and a further scanning optics 40, and a dual axis scanner 41 and a further focus-displacement optics 42, to an area detector 53 (and to the slit detector formed by the actively switched part thereof). With the aid of the focus-displacement optics 33, the focus 13 of the illuminating light beam 3 can be displaced forwards or backwards in the direction of light propagation. With the aid of the beam deflection means 34, 36, the illuminating light beam 3, in particular the focus 13 of the illuminating light beam 3, can be moved perpendicularly to the direction of light propagation.

A control device 60 is provided for controlling the beam deflection means 34, 36, the focus-displacement optics 33, the further focus-displacement optics 42, the dual axis scanner, and the movement of the slit detector 8.

Figure 11:
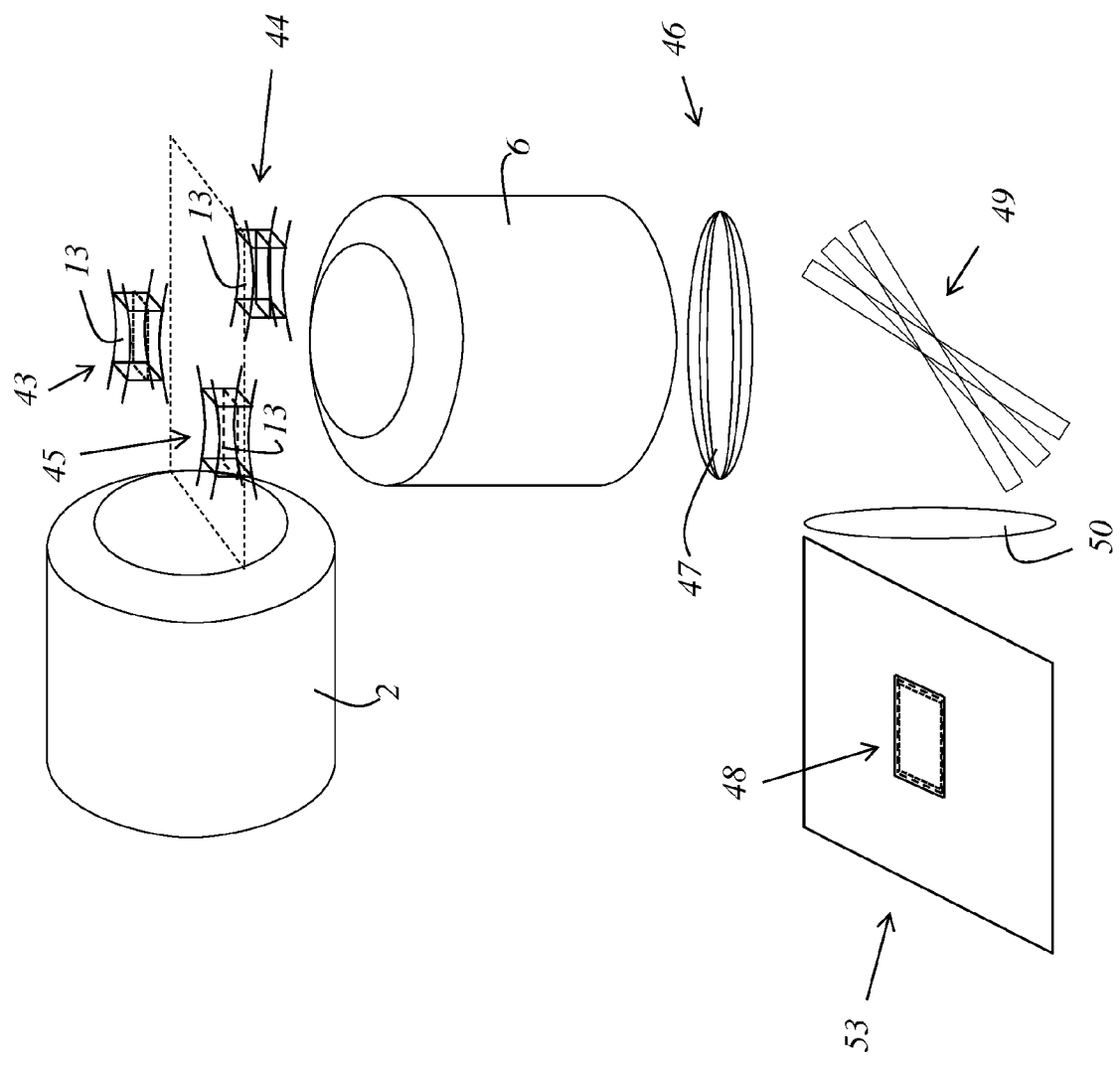
FIG. 11 is a schematic diagram of a further embodiment of the method according to the invention.

FIG. 11 schematically shows an illustration of a further embodiment of the method according to the invention. In this embodiment, a first region of interest 43, a second region of interest 44, and a third region of interest 45 of the sample are selected and illuminated one after the other by the focus 13 of an illuminating light beam 3 in a cyclical pattern. The regions of interest 43, 44, 45 are disposed in different sample planes. This requires the possibility to displace the focus 13 of the illuminating light beam 3, preferably provided as a light sheet, also along the optical axis of the detection objective 6, which can be implemented for example with the aid of beam deflection means adjustable in respect of the deflection light. In addition, an adjustable focusing means 46, which in particular can be formed as a lens 47 adjustable in respect of its focal length, for focusing on the area detector 53, which is the basis for a slit detector 8, is provided in the detection beam path.

The regions of interest are scanned in chronological succession by the focus 13 of the illuminating light beam 3 and are projected one after the other onto the same detection region 48 of the area detector 53, which is arranged downstream of a further focusing means 50. To this end, an adjustable mirror 49 is provided in the detection beam path and ensures that the detection light 3 coming from different directions of incidence is always directed to the same detection region 48 of the area detector 53. A particularly high detection rate is achieved in this way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device configured to carry out a method for examining a sample comprising:
   illuminating the sample in an illumination plane along an illumination strip by an illuminating light beam which propagates along the illumination strip, wherein the illuminating light beam is formed as a light sheet;
   projecting the illumination strip into a detection plane by detection light originating from the illumination strip being focused in the detection plane; and
   detecting the detection light by a detector,
   wherein the detector is formed as a slit detector.

2. The device according to claim 1, wherein:
   a. the slit detector comprises an area detector,
   b. the slit detector is an actively switched part of an area detector,
   c. the slit detector is movable in the detection plane relative to the incident detection light,
   d. the slit detector is movable in the detection plane in the direction of the slit width,
   e. the slit detector is movable by successive active switching and inactive switching of adjacent parts of the area detector in the detection plane, and/or f. the slit detector is movable by successive active switching and inactive switching of adjacent parts of the area detector in the detection plane in the direction of the slit width.

3. The device according to claim 1, wherein a projected image of the illumination strip is oriented perpendicularly to the direction of a longitudinal extent of the slit detector, or wherein a direction of a slit width of the slit detector is oriented at an angle different from zero degrees or at an angle of 90 degrees with respect to the direction of a width of an image of the illumination strip projected into the detection plane.

4. The device according to claim 3, wherein:
a. the area detector is arranged in the detection plane and downstream of a slit diaphragm, of which the direction of the slit width is oriented at an angle different from zero degrees with respect to the direction of the width of the projected image of the illumination strip,
b. the area detector is arranged in the detection plane and downstream of a slit diaphragm, of which the direction of the slit width is oriented at an angle different from zero degrees with respect to the direction of the width of the projected image of the illumination strip, wherein the area detector is actively switched in respect of its entire sensor area, and/or
c. the area detector is arranged in the detection plane and downstream of a slit diaphragm, of which the direction of the slit width is oriented at an angle different from zero degrees with respect to the direction of the width of the projected image of the illumination strip, wherein the slit diaphragm is embodied as a non-mechanical component.

5. The device according to claim 1, wherein:
a. the slit detector is movable in the detection plane relative to the incident detection light,
b. the slit detector is movable in the detection plane in a direction of a slit width, and/or
c. the slit diaphragm is movable in a direction of a slit width and the slit detector is movable by displacement of the slit diaphragm.

6. The device according to claim 1, further comprising:
a. a beam deflector, which is adjustable in respect of a deflection angle and with which the illuminating light beam, during the detection, is movable in the illumination plane,
b. a beam deflector, which is adjustable in respect of a deflection angle and with which the illuminating light beam, during the detection, is movable in the illumination plane perpendicularly to the direction of propagation of the illuminating light beam, and/or
c. a beam deflector, which is adjustable in respect of a deflection angle and with which the illuminating light beam, during the detection, is movable continuously back and forth in the illumination plane perpendicularly to the direction of propagation of the illuminating light beam.

7. The device according to claim 6, further comprising:
a. a control device configured to move the slit detector in the detection plane and the illuminating light beam in the illumination plane simultaneously or in alternation, and/or
b. a control device configured to move the slit detector in the detection plane and the illuminating light beam in the illumination plane synchronously with one another.

8. The device according to claim 1, further comprising:
a. a control device, which, during the detection, is configured to move a detection region which is defined by a region of intersection of a projected image of the illumination strip and of the slit detector, and/or
b. a control device, which, during the detection, is configured to move a detection region along a predefined or predefinable movement pattern which is defined by a region of intersection of a projected image of the illumination strip and of the slit detector.

9. The device according to claim 1, wherein the device is configured such that:
a. the illuminating light beam has a focus within the illumination strip, and/or
b. the illuminating light beam is focused by an illumination objective in such a way that the illuminating light beam has a focus within the illumination strip.

10. The device according to claim 9, further comprising:
a. a control device configured to move the focus of the illuminating light beam during the detection,
b. a control device configured to move the focus of the illuminating light beam during the detection by changing a length of an optical light path of the illuminating light beam,
c. a control device, which, during the detection, is configured to move a detection region along a predefined or predefinable movement pattern which is defined by a region of intersection of a projected image of the detection light originating from the illumination strip and of the slit detector, wherein the control device is configured to synchronously move the focus of the illuminating light beam in such a way that the detection light originating from the sample region illuminated by the focus is always incident on the detection plane within the detection region,
d. a focus adjustment device configured to displace a focus of the illuminating light beam,
e. a focus adjustment device configured to displace a focus of the illuminating light beam in a direction of propagation of the illuminating light beam,
f. a focus adjustment device configured to displace a focus of the illuminating light beam, the focus adjustment device having at least one arm of which an optical length is adjustable,
g. a zoom optics configured to displace a focus of the illuminating light beam,
h. a lens of variable focal length configured to displace a focus of the illuminating light beam,
i. an illumination objective or an illumination optic having an internal focusing option, and/or
j. a shifting device by which the illumination objective is arranged movably relative to the sample.

11. The device according to claim 9, wherein:
a. an optical axis of an illumination objective and an optical axis of a detection objective are oriented parallel or coaxial to one another,
b. a detection objective and an illumination objective are oriented in opposite directions to one another and opposite one another, and/or
c. a sample holder is arranged spatially between a detection objective and an illumination objective, the sample holder defining an examination position for the sample to be examined.

12. The device according to claim 9, further comprising a deflector configured to:
a. deflect the illuminating light beam, once it has passed through an illumination objective, in such a way that the deflected illuminating light beam propagates in the illumination plane, and/or b. deflect the illuminating light beam, once it has passed through an illumination objective, in such a way that the deflected illuminating light beam has an angle different from zero degrees with respect to an optical axis of the illumination objective and/or a detection objective, and/or c. the illumination plane is oriented perpendicularly to the optical axis of an illumination objective.

13. The device according to claim 1, further comprising:
a. a cylindrical optics configured to shape the illuminating light beam in such a way that the illuminating light beam is formed as the light sheet in the region of the illumination strip, and/or
b. an astigmatic optics and/or any optics configured to focus more heavily in a direction perpendicular to the direction of propagation of the illuminating light beam than in another direction perpendicular to the direction of propagation of the illuminating light beam.

14. The device according to claim 1, further comprising an illumination device configured to illuminate the sample in the illumination plane or in another illumination plane parallel to the illumination plane along at least one further illumination strip by at least one further illuminating light beam, which propagates along the further illumination strip, and wherein further detection light originating from the further illumination strip is projected into the detection plane and is detected by at least one further slit detector, wherein a direction of a slit width of the further slit detector is oriented at an angle different from zero degrees with respect to a direction of a width of an image of the further illumination strip projected into the detection plane.

15. The device according to claim 14, wherein:
a. the slit detector and the further slit detector are parts of the same area detector, and/or
b. the slit detector is an actively switched part of an area detector arranged in the detection plane, and the further slit detector is another actively switched part of the same area detector.

16. The device according to claim 1, wherein the area detector has a sensor area comprising pixels, and wherein only the pixels of a region of intersection are read out or wherein exclusively pixel rows that run through a region of intersection are read out.

17. The device according to claim 1, further comprising detection optics comprising a detection objective and being configured to focus the detection light originating from the illumination strip into the detection plane, in which the detector is arranged, so as to project the illumination strip onto the detector.

18. The device according to claim 1, wherein the device is configured such that a common region of intersection of the image of the illumination strip being projected onto the detection plane and of the slit detector defines a detection region that is moved during the detection.

19. The device according to claim 1, further comprising a rolling shutter comprising a focus of the illuminating light beam and the slit detector being configured to be moved synchronously with one another, wherein the focus of the illuminating light beam is moved in a direction of propagation of the illuminating light beam or in a direction of an optical axis of an illumination objective.

20. The device according to claim 1, wherein the device comprises a scanning microscope or a confocal scanning microscope, and/or wherein the device is produced by retrofitting of a scanning microscope or of a confocal scanning microscope.

21. A device for examining a sample, the device comprising:
an illumination device configured to illuminate a sample in an illumination plane along an illumination strip by an illuminating light beam which propagates along the illumination strip; and
detection optics comprising a detection objective and being configured to focus detection light originating from the illumination strip into a detection plane, in which a detector is arranged, so as to project the illumination strip onto the detector,
wherein the detector is formed as a slit detector.

22. A method for examining a sample, the method comprising:
illuminating the sample in an illumination plane along an illumination strip by an illuminating light beam which propagates along the illumination strip;
projecting the illumination strip into a detection plane by detection light originating from the illumination strip being focused in the detection plane; and
detecting the detection light by a detector formed as a slit detector, and
wherein the slit detector is a part of an area detector, or wherein the slit detector is an actively switched part of an area detector.

* * * * *